FACSIMILE RECORDING DEVICE

Filed July 15, 1965 4 Sheets-Sheet 1

INVENTOR.
THOMAS H. GIFFT
BY Edward A. Sopolski
ATTORNEY

FACSIMILE RECORDING DEVICE

Filed July 15, 1965 4 Sheets-Sheet 2

INVENTOR.
THOMAS H. GIFFT

BY Edward A. Sokolski

ATTORNEY

FACSIMILE RECORDING DEVICE

Filed July 15, 1965 4 Sheets-Sheet 3

INVENTOR.
THOMAS H. GIFFT

BY Edward A. Sokolski
ATTORNEY

Feb. 13, 1968 T. H. GIFFT 3,369,250

FACSIMILE RECORDING DEVICE

Filed July 15, 1965 4 Sheets-Sheet 4

INVENTOR.
THOMAS H. GIFFT

BY Edward A. Sokolski

ATTORNEY

United States Patent Office 3,369,250
Patented Feb. 13, 1968

3,369,250

FACSIMILE RECORDING DEVICE

Thomas H. Gifft, 109 Paseo De La Playa, Redondo Beach, Calif. 90277

Filed July 15, 1965, Ser. No. 473,274
10 Claims. (Cl. 346—35)

ABSTRACT OF THE DISCLOSURE

An electrically sensitive sheet is positioned between a write head which is in contact with the sheet on one side thereof and a blade which is in contact with the sheet on the other side thereof. The write head is driven across the sheet in a direction substantially parallel to the surface thereof, such write head motion being frequency and phase locked with the output of a precision pulse signal generator. The sheet is fed in a direction normal to the motion of the write head in accordance with a predetermined program in response to a digital control signal.

Figure 1:
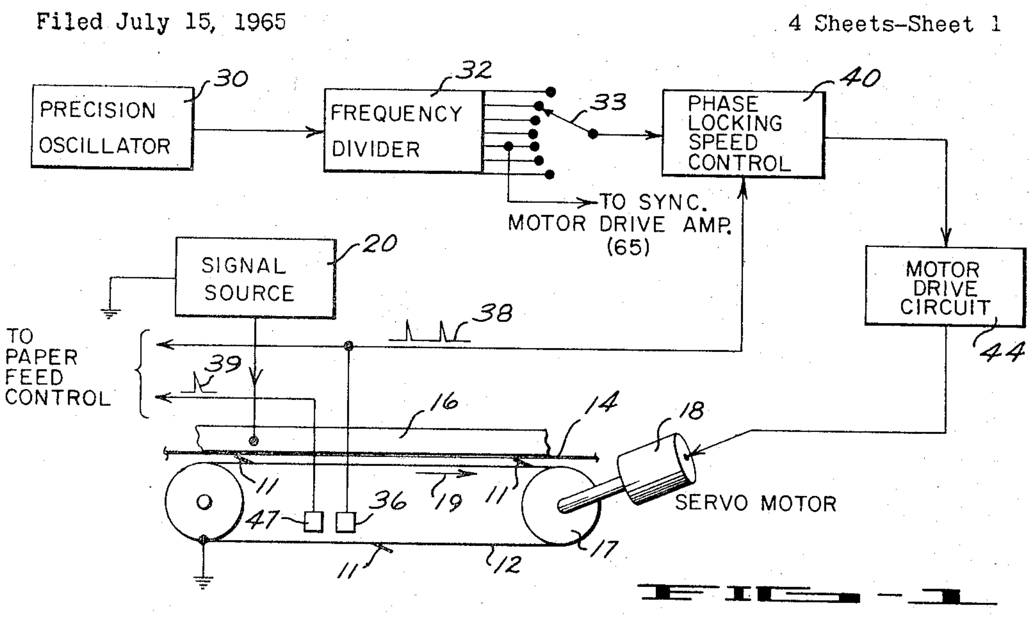

This invention relates to a facsimile recording device and more particularly to such a device which utilizes digital control techniques in its implementation.

In facsimile recording, information is recorded on a paper having an electrically sensitive coating thereon by a scanning process. Thus, the electrically sensitive paper is passed between a "write" head and a blade. Signal current is passed from the "write" head to the blade through the paper causing a mark to be scribed on the paper whenever a signal current is present. Thus, by synchronizing the scanning process with the signals to be recorded, correlated information can be scribed on the paper. Such facsimile recording is used, for example, in receiving wire photos and in recording ranging information, such as in a sonar system.

In achieving proper synchronization and control of the scanning and paper feed, highly accurate drive mechanisms are needed, especially where recording ranging information in situations in which proper interpretation of the recorded information requires accurate and varied types of control. Thus, for example, in sonar ranging it is necessary that the start of the scan cycle coincide precisely with the transmitted sounding signal. It is also desirable in some instances to skip certain recording cycles and intermittently stop the paper feed in accordance with a predetermined program. Recorder devices of the prior art generally utilize mechanical devices in achieving these end results such as gearing, clutch mechanisms, mechanical commutators and the like. Such mechanical implementations are often very complicated and costly, and also in some instances tend to lack the accuracy and reliability to be desired. Further, where complicated programming is involved, as in the case of certain sonar ranging devices, such mechanical techniques are very difficult to implement.

The device of this invention overcomes the shortcomings of prior art facsimile recorders by utilizing digital control for both the "write" head scanning and the paper feed. This end result is achieved by utilizing a stepping motor for driving the paper feed mechanism, this stepping motor being controlled by pulses, the appearance of which is responsive to a digital programmer. These pulses are further synchronized with the scanning by means of synchronization pulses, sensed by a pickup which indicates predetermined positions of the "write" head. Scanning control is achieved by means of a phase locking speed control which receives pulse signals received from a pickup which sense the speed of the "write" head and pulses from a command signal source. The phase locking speed control which is utilized to control the servo motor which drives the "write" head mechanism operates to precisely phase lock the sensed pulses to the command signals. Thus, a servo loop is provided which enables precise control of the "write" head speed in accordance with the command signals.

In typical facsimile recorders of the prior art, a helical writing mechanism is utilized to distribute the wear on the "write" head so as to obtain long-life performance. While the desired objectives are effectively achieved, this type of writing mechanism has several disadvantages. Firstly, the intersection between the helical element and the oppositely positioned blade, between which the paper passes, does not provide a sharp point contact and thus the recording "spot" size is larger than would be desired. Further, it has been found that as the scanning helix rotates and the wire rubs against the moist recording paper used, fibres are picked up which cling to the wire. Before the helix fully rotates and the same spot on the wire returns to the paper, the fibre has dried and clings hard to the wire. As a result, paper chaff builds up on the helix wire until it forms an insulation thereon, preventing passage of the marking current resulting in blanks in the recorded data. This type of recorder, therefore, must be stopped periodically and the helix cleaned.

The "write" head utilized in the device of the invention completely overcomes these shortcomings by making use of a writing element in the form of a small flat spring element with a straight edge which intersects the blade perpendicularly. This spring element has relatively low mass and high compliance so that it exhibits good mechanical response characteristics. The blade is canted slightly with respect to the scanning "write" head so that as it scans, wear is distributed over its writing edge. The perpendicular relationship between the "write" head edge and the blade assures a minimal spot size. Further, in view of the fact that substantially all of the portions of the "write" head edge are at one time or another in contact with the blade during each scan, it is assured that any fibres that are picked up are wiped off before they have had time to dry.

It is therefore an object of this invention to provide an improved facsimile recorder device.

It is a further object of this invention to increase the reliability of operation of facsimile recorder devices.

It is still another object of this invention to provide a facsimile recorder device having greater versatility of operation than prior art devices.

It is still another object of this invention to provide a facsimile recorder device having high accuracy which is of simpler and more economical construction than prior art devices.

It is still a further object of this invention to provide an improved facsimile recording device in which digital techniques are utilized for both scanning and paper feed controls.

It is still another object of this invention to provide an improved facsimile recorder device having an improved "write" head mechanism.

Figure 2:
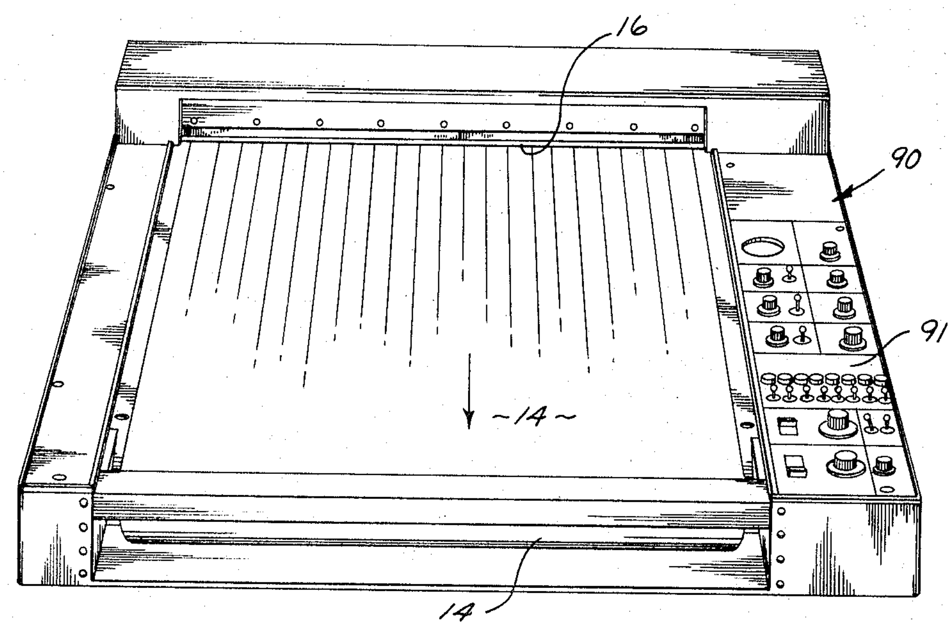
Figure 3:
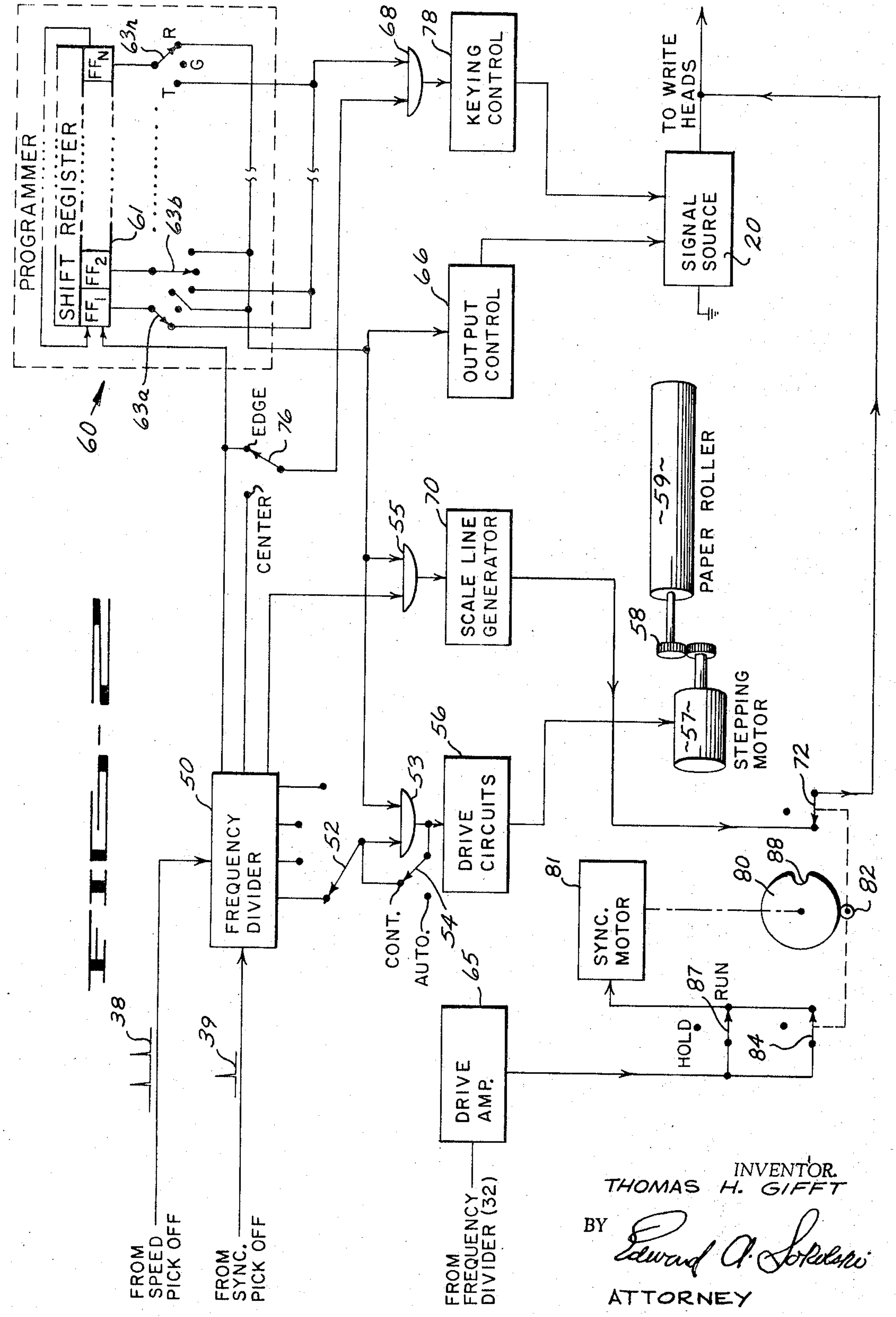
Figure 4:
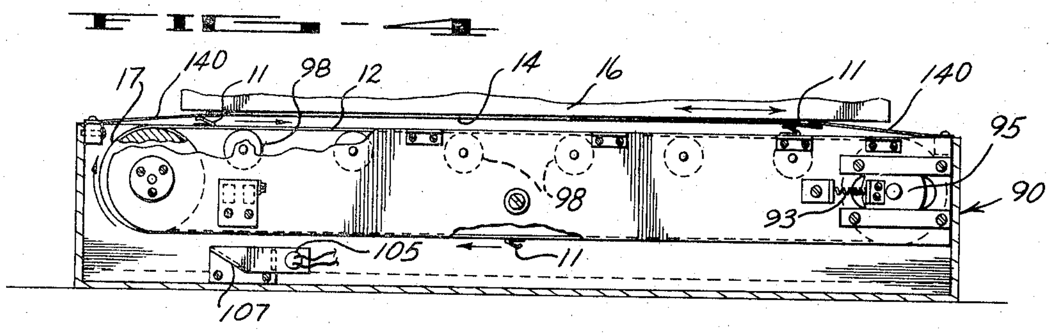
Figure 5:
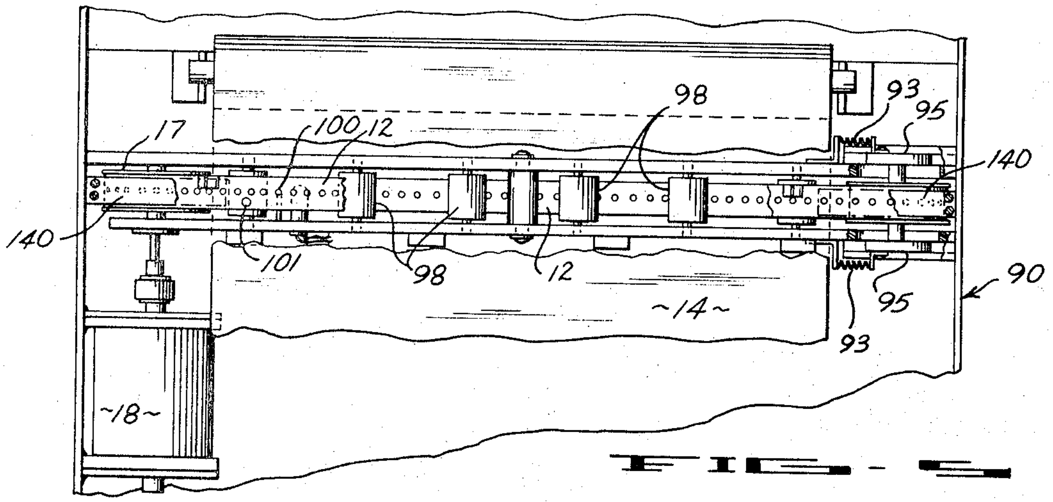
Figure 6:
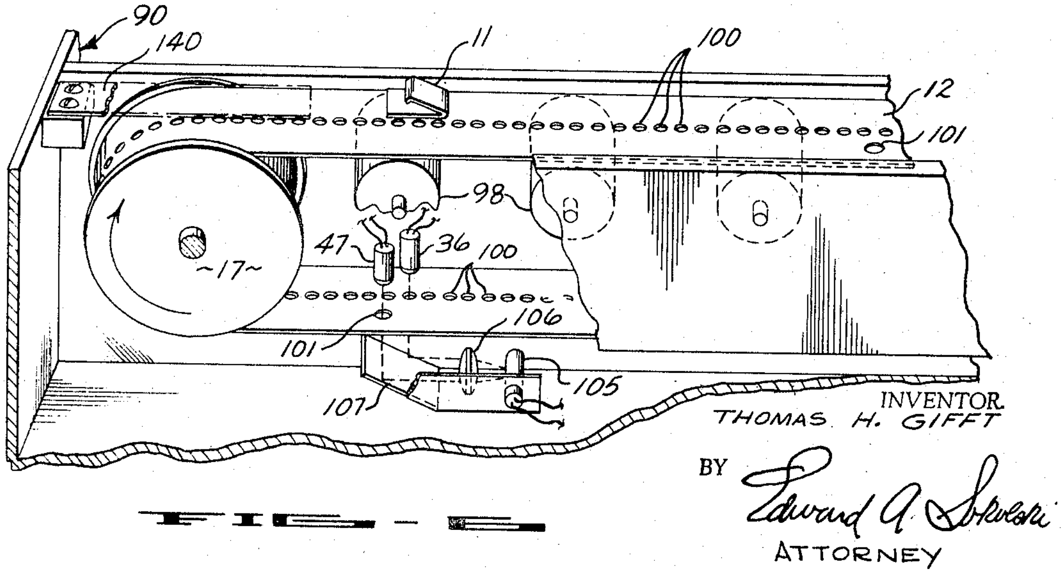
Figure 7:
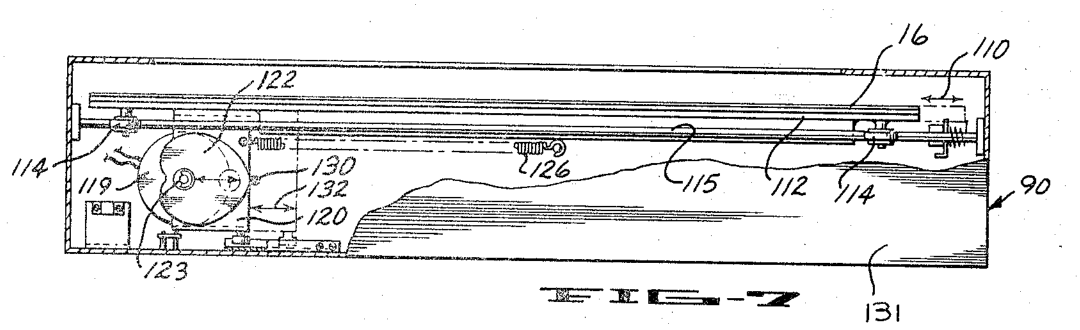
Figure 8:
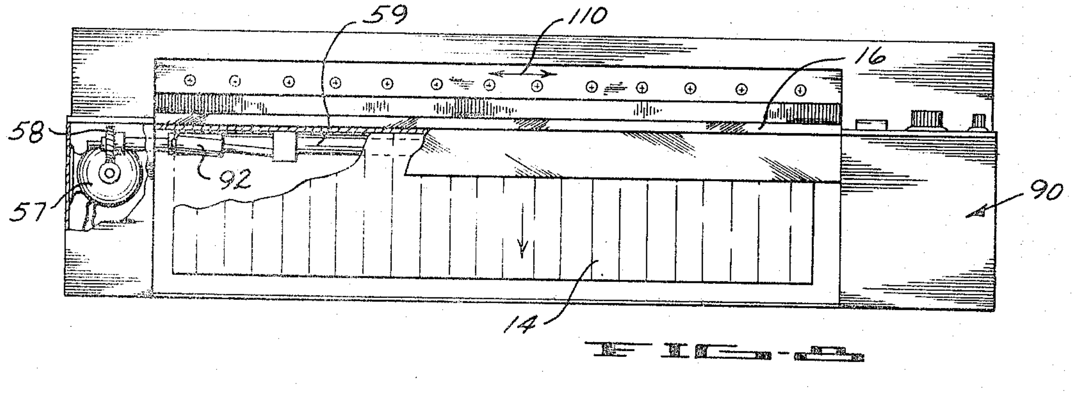
Figure 9:
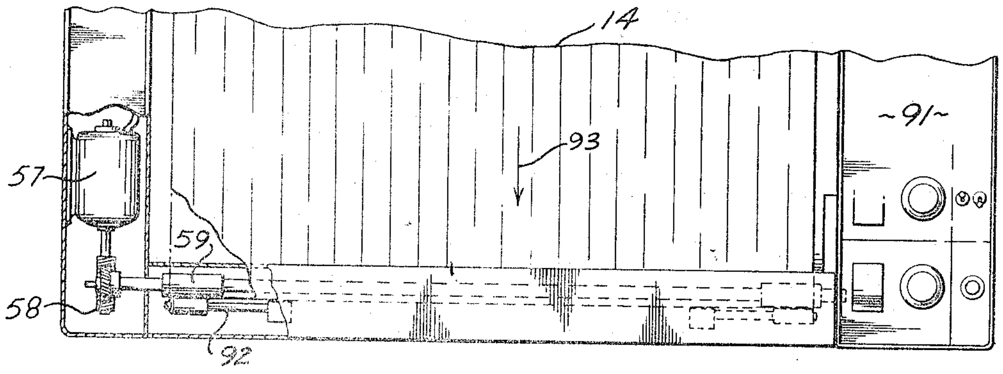

Other objects of this invention will become apparent from the following description taken in connection with the accompanying drawings, of which FIG. 1 is a schematic drawing illustrating the scanning control mechanism utilized in the preferred embodiment of the device of the invention, FIG. 2 is a schematic drawing illustrating the paper feed and write and transmit controls of the preferred embodiment of the device of the invention, FIG. 3 is a perspective view illustrating the preferred embodiment of the device of the invention, FIG. 4 is an elevation view partially in cross section of the scanning mechanism of the preferred embodiment of the device of the invention, FIG. 5 is a plan view of the scanning mechanism of the preferred embodiment of the device of the invention, FIG. 6 is a perspective view illustrating the speed and position pickup devices utilized in the preferred embodiment of the device of the invention, FIG. 7 is a top plan view illustrating the blade drive mechanism utilized in the preferred embodiment of the device of the invention, FIG. 8 is an end elevation view of the preferred embodiment of the device of the invention illustrating the paper feed drive mechanism, and FIG. 9 is a top plan view illustrating the paper feed drive mechanism of the preferred embodiment of the device of the invention.

Referring now to FIG. 1, the "write" head scanning mechanism of the preferred embodiment of the device of the invention is shown. "Write" heads 11, which, as to be explained in detail in connection with FIG. 6, consist of flat spring members with straight edges and are resiliently attached to drive band 12. Three "write" heads 11 are utilized so that as soon as one head has completed its scan, another "write" head appears to start a new scan. Blade 16 is positioned above the scanning "write" heads 11, and sandwiched between the "write" heads and the blade is recording paper 14. Drive band 12 is driven continually in the direction of arrow 19 by drive spool 17, which in turn is driven by servo motor 18.

The signals to be recorded are fed from signal source 20 to blade 16. Blade 16, "write" heads 11 and drive band 12 are all electrically conductive, and when there is a signal output from signal source 20 the current is carried through the electro-chemically coated paper and thence through one of "write" heads 11 and drive band 12 to the ground. At the times when such a current is present, a mark is produced on paper 14 at the point of contact therewith of "write" head 11. In this manner, marks are produced on paper 14 in accordance with the output of signal source 20 and the scanning of "write" heads 11. The point on paper 14 at which the mark appears, of course, depends upon the speed and phase of the scanning of "write" heads 11. Therefore, for accurate recording, it is essential that these two parameters be closely controlled. This end result is achieved in the device of the invention in the following manner:

An oscillatory signal having a precise frequency is generated in precision oscillator 30 which may be of the crystal controlled variety. The output of oscillator 30 is fed to frequency divider 32, which may be a conventional frequency divider which divides the frequency down to the frequencies desired for scanning. Various scanning frequencies may be selected by means of selector switch 33. It is to be noted in this regard that in a ranging system, the scanning speed determines the range calibration of the device, and thus selector switch 33 in this type of device is the range scale selector switch. The speed of motion of drive band 12 and thus, that of "write" heads 11, is detected by means of pickup 36. This pickup may comprise a photoelectric cell and operate in conjunction with an optical detection system, as explained in connection with FIG. 6, or may be of another suitable type such as, for example, a magnetic pickup operating in conjunction with magnetic markings on drive band 12. In any case, pickup 36 produces output pulses 38 which have a frequency proportional to the speed at which "write" heads 11 are being driven.

Pulses 38 are fed to phase locking speed control 40. Phase locking speed control 40 compares the pulses received from frequency divider 32 with pulses 38 and produces an output drive signal to motor drive circuit 44 in accordance with the difference in phase and frequency therebetween. Motor drive circuit 44 thus drives servo motor 18 so as to maintain the speed of motion of "write" heads 11 locked to the frequency of the selected output of frequency divider 32. A phase locking speed control device which may be utilized for phase locking speed control 40 is described, for example, in my Patent No. 3,176,-208, issued Mar. 30, 1965. In this manner, the scanning of "write" heads 11 is precisely servo controlled in response to digital control signals.

A second pickoff 47, similar in configuration to pickoff 36, is utilized to detect the start of each of "write" heads 11 on a scanning cycle. Thus, the bottom portion of drive band 12 is appropriately marked so that pickoff 47 generates a pulse signal 39, in response thereto, just as each of "write" heads 11 arrive at the left edge of paper 14. The details of the pickoff mechanism 47 utilized in the preferred embodiment of the device of the invention are described in connection with FIG. 6.

Referring now to FIG. 2, a paper feed mechanism and a write and transmit control, utilized in the preferred embodiment of the device of the invention, is shown. Frequency divider 50 receives pulses 38 from speed pickoff 36 (FIG. 1), which are indicative of the scanning speed of "write" heads 11. Pulses 38 are divided down to provide various frequency outputs which may be selected by means of switch 52. Frequency divider 50 may, for example, comprise a series of flip-flop divider stages. The flip-flop stages of divider 50 are reset by output pulses 39 from pickoff 47 (FIG. 1). Frequency divider 50 is thus reset at the start of each scan cycle so that the divided output thereof is likewise so synchronized. Various frequency outputs of frequency divider 50 may be selected by means of switch 52 from which they are fed to AND gate 53 and switch 54. With switch 54 in the indicated position, that is, with the switch in the "CONT." or continuous position, signals are fed directly through from switch 52 to drive circuits 56. The output of drive circuits 56 is fed to stepping motor 47 which through simple gear train 58 drives paper roller 59. Stepping motor 57 is thus rotated a discreet interval for each pulse received thereby from drive circuits 56. Paper roller 59 is thus driven in accordance with the pulse output of frequency divider 50. It can be seen that, in this manner, very precise control of the paper roller can be achieved without resorting to a complicated and expensive mechanical drive mechanism. Further, the simple frequency countdown utilized enables selection of feed rates in terms of lines per inch without resorting to complicated gear trains as is necessary in prior art devices. Very precise control is thus possible with rapid starting and stopping feasible without overloading the drive mechanism, this by virtue of the digital drive mechanism utilized.

Another advantage of the digital control utilized for the paper feed mechanism is its ready adaptability for use in programmed control. Thus, the paper feed may be programmed so that motion is instantaneously stopped when writing is gated off and the paper moves only when the recorder is actually writing, thus avoiding blanks on the paper. Such programming control is achieved by means of programmer 60. Programmer 60 comprises a shift register 61 which includes a plurality of flipflop stages, ($FF_1$–$FF_n$). A frequency divided output of frequency divider 50, which has a frequency of one pulse per scan of each one of "write" heads 11, is fed to shift register 61 and provides the shift signal therefor. Thus, each time a pulse is received by the shift register from frequency divider 50, shift register 61 is advanced to provide an output from a succeeding one of its stages $FF_1$–$FF_n$. Each of flipflop stages $FF_1$–$FF_n$ has a switch 63*a*–63*n* associated therewith respectively. Thus, these outputs may be selected for utilization as is desired. Each of the switches has three positions. One of these positions, which for exemplary purposes is indicated as "G" for switch 63*n*, has nothing connected thereto and thus provides no utilization of the shift register output. Another of these positions, indicated as "R" for switch 63*n*, acts to gate the receiving operation and is connected to output control 66 and AND gates 53 and 55. The last of these positions marked "T" for switch 63*n*, is connected to AND gate 68 and controls the transmitting mode of operation in a ranging system such as a sonar. Thus, transmitting and receiving operation for successive scan cycles can be programmed or skipped as desired by appropriately setting the various switches *63a–63n*. With any particular switch in the "G" position, both transmitting and transcribing of information during the associated scan is prevented.

With any switch in the "R" position, an enabling signal is fed from the associated flipflop stage of shift register 61 to output control 66 which controls the gating of signal source 20. In the absence of an enabling signal from output control 66 there can be no output from signal source 20 to "write" heads 11. Thus, the writing during each successive scan is determined by the settings of control switches *63a–63n*. The signal at the "R" terminal of the switches also provides an enabling signal to AND gate 53. With switch 54 in the "AUTO" or automatic position, AND gate 53 provides an output to drive circuits 56 only when the pulses from frequency divider 50 are received simultaneously with an enable signal from one of switches *63a–63n*. Thus, output is provided from drive circuits 56 to drive stepping motor 57 only in accordance with the program set on the selector switches *63a–63n*. In this fashion, the feeding of paper by means of paper roller 59 is controlled for each successive scan in accordance with the desired program. The outputs of the "R" terminal are also fed to AND gate 55 to enable the writing of the range scale lines for a ranging system in accordance with the desired program. Such scale lines are generated in scale line generator 70 which is connected through switch 72 to "write" heads 11. Scale line generator 70, which generates range marking pulses in response to the synchronized signal output of divider 50, produces an output signal when it receives an output from AND gate 55. Such an output is present only when the predetermined output of frequency divider 50 is received by this AND gate simultaneously with one of the selected outputs of shift register 61, thus providing range markers only in accordance with the desired program.

With any of the switches *63a–63n* in the "T" position, a keying signal is fed to AND gate 68 in accordance with the associated flipflop output. Also fed to AND gate 68 is a pulse signal at the rate of one pulse for each drive head scan. This pulse may be synchronized with either the start of such scan or the mid point of such scan by setting switch 76 to either the "edge" position or the "center" position respectively. Such alternative synchronization, which is achieved by using one of the outputs of an appropriate flipflop of divider 50 for "edge" and the other output of this same flipflop for "center," may be utilized to satisfy different operational requirements. The output of AND gate 68 is fed to keying control 78 which controls the keying of the transmitter of signal source 20, which may for example be the ranging transmitter of a sonar system. Thus, the scans on which transmitting occurs can be programmed.

The scale lines can be interrupted at predetermined intervals to provide an interrupting marking signal, by means of cam 80 which is driven by synchronous motor 81 and which through cam follower 82 drives switches 72 and 84. Synchronous motor 81 receives its output from drive amplifier 65 which in turn is driven by a preselected output of frequency divider 32 (FIG. 1). Thus, this marking signal in the form of an interruption of scale line writing is provided at precisely predetermined time intervals. If it is desired that the writing of scale lines be stopped and held stopped at the end of a predetermined period, switch 87 may be placed in the "hold" position, in which case once cam follower 82 has entered slot 88 of the cam, the power to synchronous motor 81 is interrupted with the opening of switch 84 and cam 80 is held in this position. This keeps switch 72 open so as to cut off the feeding of any output from scale line generator 70 to the "write" head until switch 87 is reset to "run."

In this manner, programming of the operations during various successive scan cycles can be controlled. Such control is particularly significant in sonar sounding where it is often desirable to avoid transcribing certain unwanted echoes, such as for example might be caused by surface reverberation, fish, ship hulls, and the like. These unwanted echoes can be effectively eliminated merely by properly setting the appropriate switches of the programmer.

Referring now to FIGS. 3–9, the mechanical details of the preferred embodiment of the device of the invention are illustrated. FIG. 3 shows the overall unit, while the various other figures illustrate details of particular portions thereof.

Referring now particularly to FIGS. 3, 4, 8 and 9, the paper 14 is fed from a feed roll (not shown) between blade 16 and drive heads 11 to feed roller 59. Feed roller 59 is driven by stepping motor 57 through gear train 58. The paper is frictionally held to the roller by means of roller clamps 92 and is thus drawn in the direction indicated by arrow 93 in accordance with the rotational output of stepping motor 57. As shown in FIG. 3, the entire unit is housed in casing 90 which has a control panel 91 with various switches and control knobs for setting the various control functions associated with the programmer, frequency divider, etc. As already noted in connection with FIG. 2, stepping motor 57 drives the paper in accordance with precise synchronized digital control signals which may be in accordance with a preselected program.

Referring now particularly to FIGS. 4–6, the drive mechanism for "write" heads 11 is illustrated. "Write" heads 11 are resiliently attached to drive band 12 and are spaced along the drive band so that just as one "write" head commences a scan underneath paper 14, another "write" head is just completing its scan. Thus, with band 12 forming an endless loop, there are three "write" heads 11 to provide continuous scanning. "Write" heads 11 and band 12 are fabricated of an electrically conductive material with "write" heads 11 preferably comprising small flat spring members having a relatively low mass and high compliance so as to maintain uniform pressure against the paper at high speeds and in the face of clearance variations between the scanning mechanism and blade 16. "Write" heads 11 may, for example, be fabricated of stainless steel. The "write" heads are constructed so that they have uniformly distributed mass and compliance with substantially no lumping of these qualities. This assures good mechanical response by providing a substantially constant mechanical impedance at the "write" head contact points with the paper, over the range of motion frequencies the "write" heads are likely to encounter. Band 12 is held between drive spool 17 and idler spool 95 in friction tight relationship. Idler spool 95 is spring loaded in a direction away from spool 17 by means of springs 93. Drive spool 17 is rotatably driven by servo motor 18, while idler spool 95 is rotatably mounted in casing 90. Drive band 12 is prevented from sagging by roller wheels 98 which are rotatably mounted on casing 90. A plurality of closely spaced holes 100 are formed in drive band 12 along the entire length thereof in a substantially linear relationship. Three larger holes 101 are also formed in the band, each being located at a position to provide synchronization with the start of a scan cycle by an associated one of "write" heads 11.

Referring now particularly to FIG. 6, an electro-optical pickoff system that may be utilized in the device of the invention is illustrated. Light from light bulb 105 passes through collimating lens 106 to reflecting mirror 107. The light rays are reflected upwardly through apertures 100 and 101 in band 12 to photo electric cells 36 and 47 respectively. The photo electric cells thus receive light inputs only when the aperture portions of drive band 12 are in the light path. The output of photo electric cell 36 is utilized in the scanning speed and paper feed controls, while the output of photo cell 47 is used in synchronizing paper feed control (see FIGS. 1 and 2). The output of photo cell 36, thus, is a series of pulses having a frequency directly proportional to the speed of drive band 12 and hence the speed of scanning by "write" heads 11. This signal, as explained in connection with FIG. 1, is utilized in the scanning servo circuit to precisely control the scanning speed. The output of photoelectric cell 47 consists of pulses indicative of the commencement of each scan cycle, this information being utilized in synchronizing the paper feed. Accurate control sgnals are thus provided in a relatively simple manner.

Referring now to FIG. 7, the drive mechanism for blade 16 is illustrated. In the preferred embodiment of the device of the invention, blade 16 is oscillated back and forth at a speed of the order of 1 cycle every 40 minutes. Blade 16 is positioned so that its longitudinal axis is substantially normal to the edges of "write" heads 11, but is canted slightly with respect to these edges in the horizontal plane. This tends to bring different portions of the "write" head edges into contact with the edge of blade 16 as the scanning cycle proceeds and as blade 16 oscillates in the directions indicated by arrows 110. This tends to distribute the wear that occurs when current is passed through the contacting edges.

Blade 16 is oscillated back and forth in the following manner. Blade 16 is fixedly attached to rail 112, which has roller wheels 114 rotatably mounted theeon. Roller wheels 114 ride on track 115 which is fixedly attached to casing 90. Motor 119 is fixedly mounted on plate 120 which in turn is fixedly attached to rail 112. Heart shaped cam 122 is fixedly attached to the output shaft 123 of motor 119 and is rotatably driven thereby. Spring 126 is attached at one end thereof to casing 90 and at the other end thereof to plate 120, thereby urging this plate and its associated bar 112 to the right (as shown in FIG. 7). Cam 122 abuts against post 130 which is fixedly attached to the cover portion 131 of case 90. Thus as cam 122 is rotated, plate 120 and blade 16 which is connected thereto are oscillated back and forth in the directions indicated by arrows 132.

Referring now particularly to FIG. 4, let us review the writing operation. Drive band 12 is driven in the directions indicated by the arrows and carries along with it resiliently mounted "write" heads 11. The recording paper 14 passes between blade 16 and "write" heads 11 with the "write" heads 11 pressing the paper against the edge of blade 16 as scanning is accomplished. "Write" heads 11 are prevented from catching the edges of the paper by means of resilient flap guards 140, which are attached to the sides of casing 90 and prevent heads 11 from tearing the paper edges. The signal current to be recorded is fed to blade 16, drive band 12 being appropriately grounded to provide a return path for this current (see FIG. 1). Thus, whenever during the scanning cycle signal current appears in blade 16, it passes through chemically coated paper 14 to blade 11 and thence to drive band 12. The passage of such current through paper 14 causes a mark to be made thereon. The edge of each of "write" heads 11 forms a small contacting surface with the edge of blade 16 through the paper, and thus relatively sharp definition is achieved. The canting of blade 16 relative to drive heads 11 in the horizontal plane, along with the oscillating motion of blade 16 assures uniform wear of these contacting elements. Further, substantially the entire drive head edge contacts the paper during each scan cycle assuring that any paper fibers picked up are wiped clean and thus preventing the buildup of paper chaff.

The device of this invention thus provides a versatile facsimile recorder device which is capable of highly accurate and reliable performance. No complicated gearing trains are necessary to achieve intricate programming, these end results being achieved by a novel digital control. Further, a novel scanning write head device is utilized which attains high definition, avoids intermittent and unreliable operation due to paper chaff build up, and evenly distributes wear so that highly accurate and reliable operation is assured.

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. A facsimile device for recording information on an electrically sensitive sheet, comprising
   write head means positioned in contact with the sheet on one side thereof,
   blade means positioned in contact with the sheet on the side thereof opposite said one side,
   a signal source, the output of which is to be recorded, said signal source output being connected between said write head means and said blade means,
   a precision pulse signal generator,
   means for driving said write head means substantially parallel to the surface of said sheet, and
   means for controlling said driving means to frequency and phase lock the motion of said write head means with the output of said signal generator, said controlling means comprising pickoff means for detecting the speed of motion of said write head means, and means for comparing the output of said pickoff means with the output of said signal generator and generating an output in accordance with the difference in frequency and phase therebetween, said output in accordance with the difference in frequency and phase being fed to said driving means.

2. A facsimile device for recording information on an electrically sensitive sheet comprising
   write head means positioned in contact with the sheet on one side thereof,
   blade means positioned in contact with the sheet on the side thereof opposite said one side,
   a signal source, the output of which is to be recorded, said signal source output being connected between said write head means and said blade means,
   a command signal source,
   means for driving said write head means substantially parallel to the surface of said sheet,
   means for controlling said driving means to lock the motion of said write head means with the output of said command signal source, and
   means for feeding said sheet between said blade means and said write head means in a direction substantially transverse to the direction in which said write head means is driven, said feeding means comprising means for frictionally driving said sheet, stepping motor
   means for driving said frictional drive means, and precision pulse source means synchronized with said command signal source for precisely driving said stepping motor means and programmer means for controlling the feeding of pulses from said precision pulse source to said stepping motor in accordance with a predetermined program.

3. In combination,
   a signal source,
   an electrically sensitive sheet on which the output of said signal source is to be recorded,
   blade means having a relatively thin elongated edge positioned with said edge in contact with the sheet on one side thereof,
   write head means having a relatively thin edge positioned in contact with said sheet on the side thereof opposite said one side,
   drive means for causing said write head means to unidirectionally scan said sheet with the edge of said write head means in tangential relationship with said sheet,
   said signal source output being connected between said write head means and said blade means,
   means for generating precise pulse signals for controlling the scan frequency of said drive means, means for detecting the speed of the motion of said write head means, and means for comparing the output of said detecting means with said pulsed signals and generating a control signal in accordance with the difference in frequency and phase therebetween, said control signal being fed to said drive means to control the motion thereof.

4. The combination as recited in claim 3 wherein said drive means includes an endless band, said write head means including at least one spring element resiliently mounted on said band.

5. The combination as recited in claim 4 wherein said endless band has equispaced marking indicia formed thereon, said means for detecting the speed of motion of said write head means including pickoff means positioned adjacent to said band for sensing the velocity of travel of said marking indicia.

6. The combination as recited in claim 5 wherein said endless band has a synchronization marking indicia formed therein corresponding to the commencement of each scan of said sheet by said write head means and means for generating a signal indicating the commencement of each said scan including pickoff means positioned adjacent to said band for detecting the passage of said synchronization marking indicia.

7. The combination as recited in claim 3 and additionally including means for slowly oscillating said blade means reciprocally parallel to the surface plane of said sheet.

8. In combination, a signal source, an electrically sensitive sheet on which the output of said signal source is to be recorded, blade means having a relatively thin elongated edge positioned with said edge in contact with the sheet on one side thereof, write head means having a relatively thin edge positioned in contact with said sheet on the side thereof opposite said one side, drive means for causing said write head means to unidirectionally scan said sheet with the edge of said write head means in tangential relationship with said sheet, said signal source output being connected between said write head means and said blade means, means for generating precise pulse signals for controlling the scan frequency of said drive means, means for detecting the speed of motion of said write head means, means for comparing the output of said detecting means with said pulsed signal and generating a control signal in accordance with the difference in frequency and phase therebetween, said control signal being fed to said drive means to control the motion thereof, and means for feeding said sheet between said blade means and said write head means in a direction transverse to the scan direction of write head means, said feeding means including a paper roller, a stepping motor for driving said roller, and precision pulse source means synchronized with said scan frequency pulse signals for driving said stepping motor.

9. The combination as recited in claim 8 wherein said precision pulse source means includes a frequency divider for generating a plurality of pulse outputs having different frequencies and means for selectively feeding one of said outputs to said stepping motor.

10. The combination as recited in claim 8 and additionally including programmer means for controlling the feeding of pulses from said precision pulse source means to said stepping motor in accordance with a preselected program.

References Cited

UNITED STATES PATENTS

| | | | |
|---|---|---|---|
| 2,278,919 | 4/1942 | Erickson et al. | 346—35 |
| 2,759,043 | 8/1956 | Long | 178—6.6 |
| 2,785,944 | 3/1957 | Clurman | 346—101 |
| 2,877,297 | 3/1959 | Marzan | 178—6.6 |
| 2,879,129 | 3/1959 | Alden | 346—139 |
| 2,924,659 | 2/1960 | Cooley | 346—139 |
| 3,050,580 | 8/1962 | Schwertz | 346—35 |
| 3,166,752 | 1/1965 | Waterman | 346—139 |

FOREIGN PATENTS

| | | |
|---|---|---|
| 289,857 | 10/1931 | Italy. |

RICHARD B. WILKINSON, *Primary Examiner.*

M. LORCH, *Assistant Examiner.*